T. G. PLANT.
SEWING MACHINE.
APPLICATION FILED APR. 17, 1907. RENEWED APR. 14, 1909.
940,724.
Patented Nov. 23, 1909.
4 SHEETS—SHEET 4.
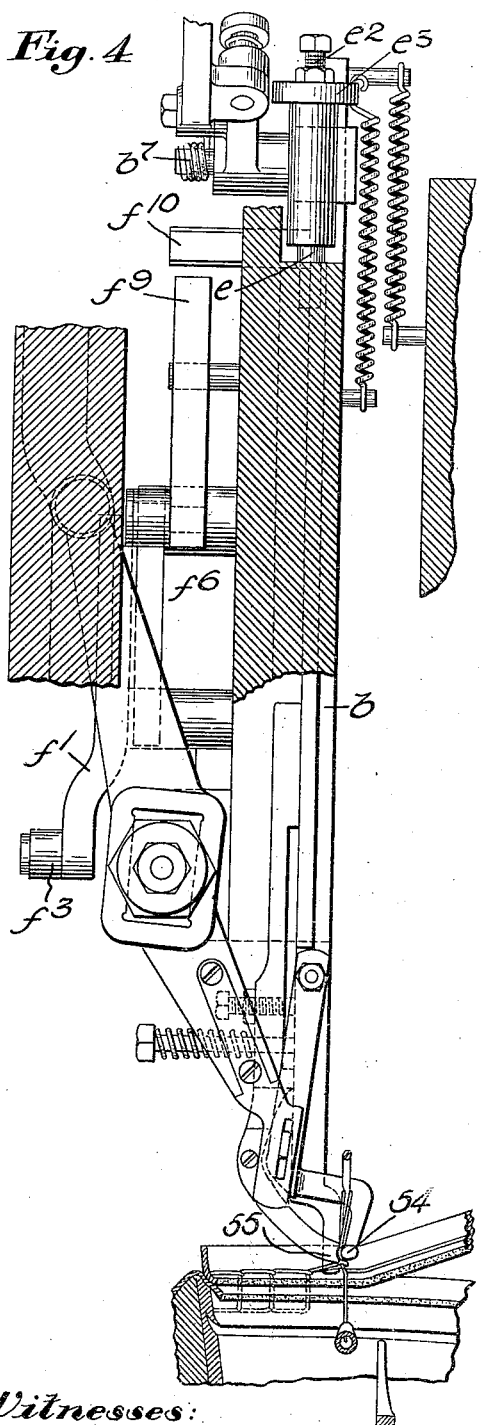
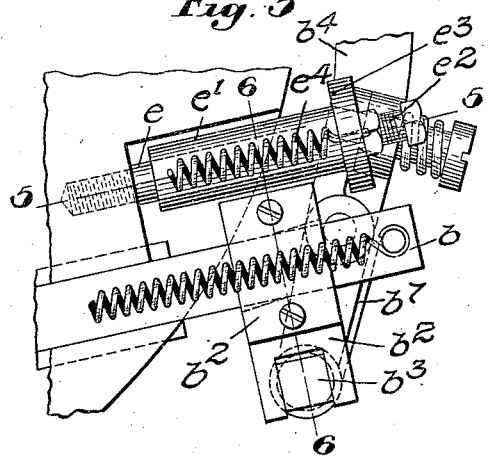
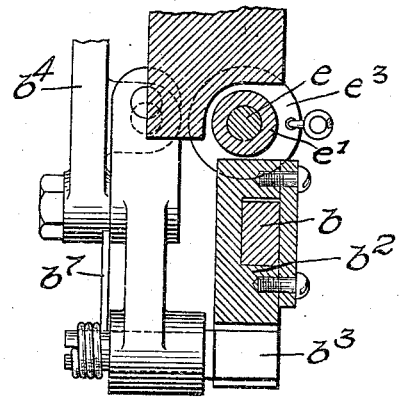
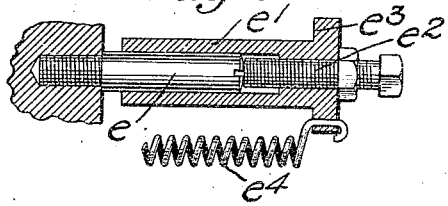
Witnesses:
Horace H. Crossman
Adolph C. Kaiser
Inventor:
Thomas G. Plant
by Emery & Booth
Attys.

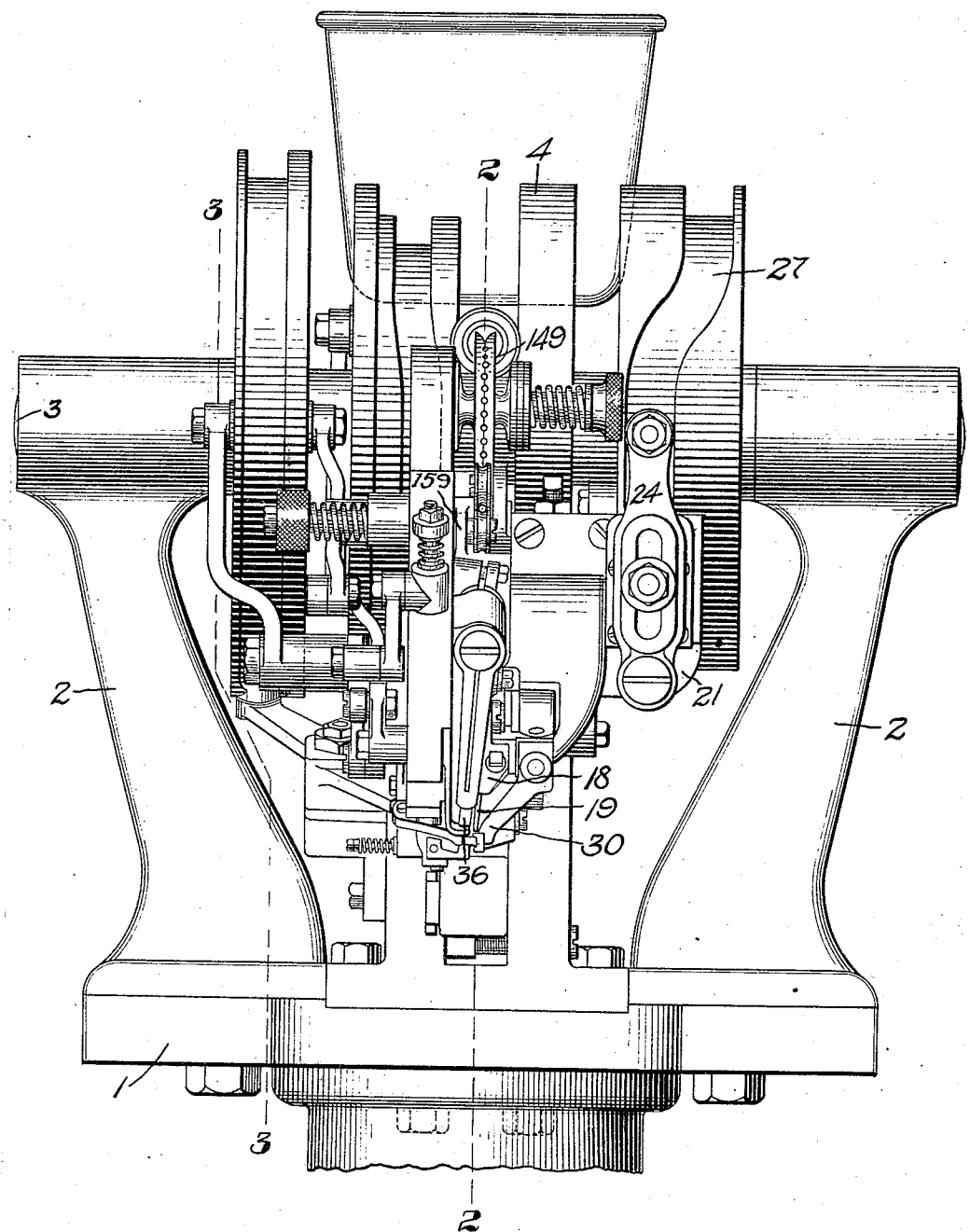

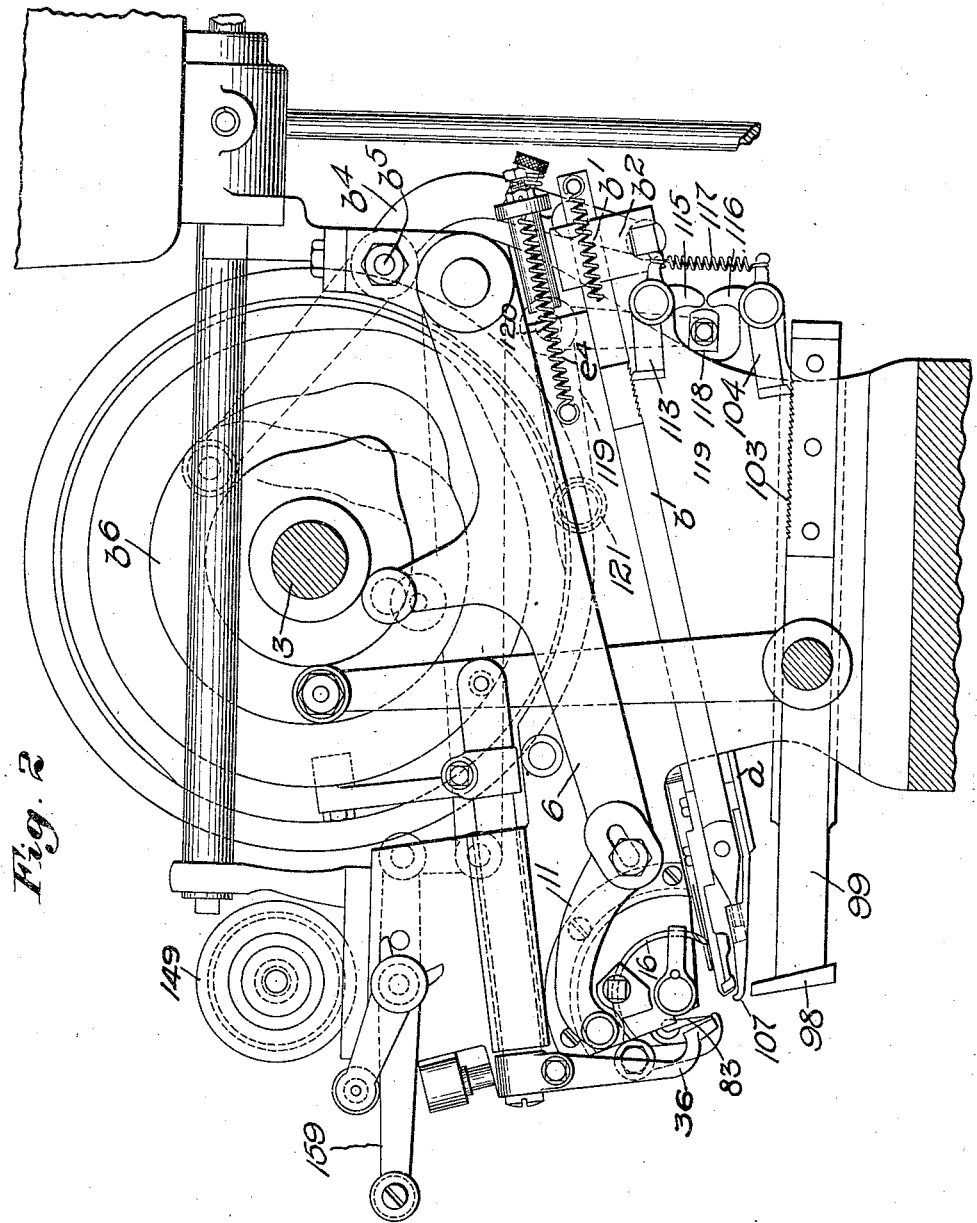

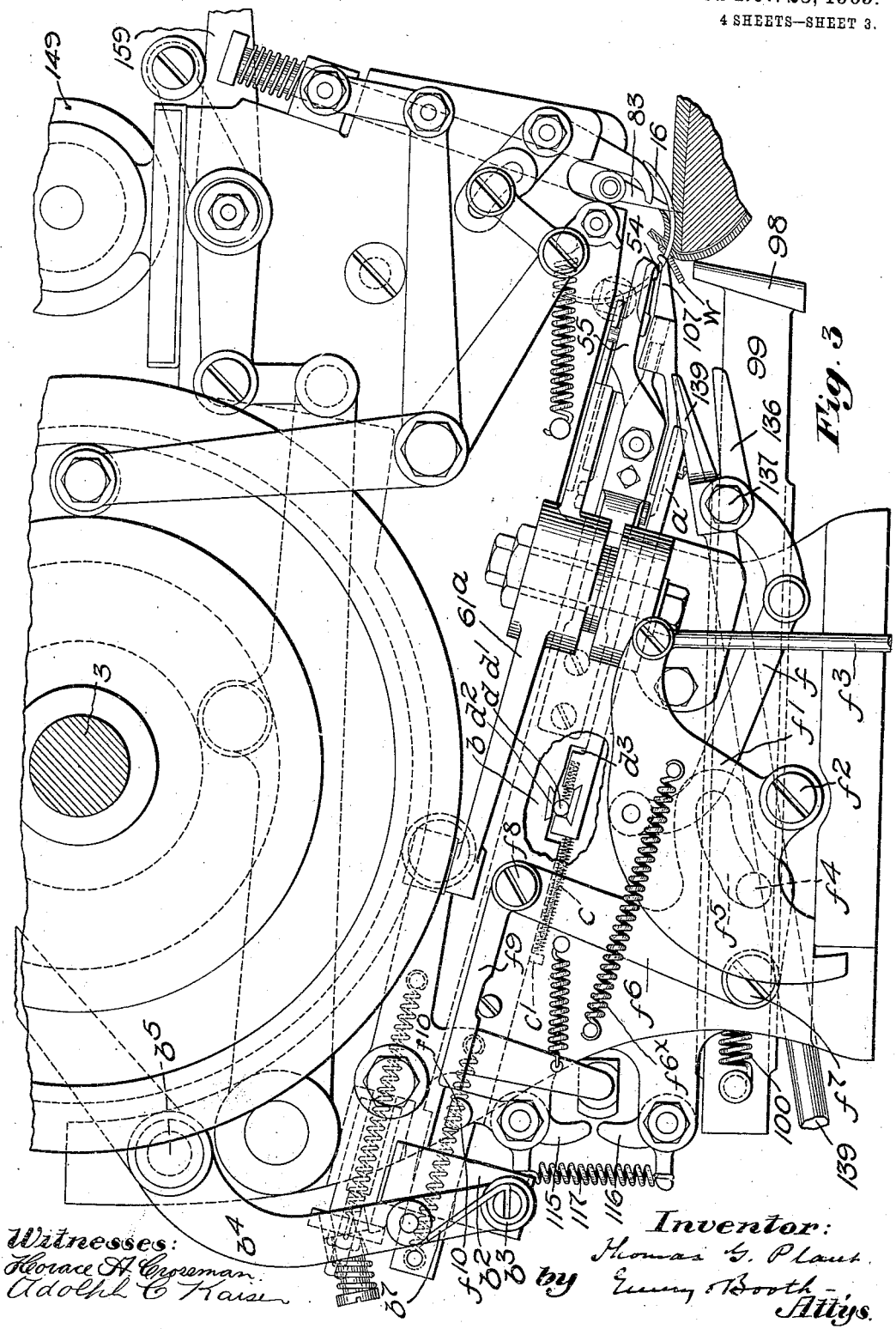

UNITED STATES PATENT OFFICE.

THOMAS G. PLANT, OF BOSTON, MASSACHUSETTS.

SEWING-MACHINE.

940,724.   Specification of Letters Patent.   Patented Nov. 23, 1909.

Application filed April 17, 1907, Serial No. 368,618.   Renewed April 14, 1909.   Serial No. 489,889.

*To all whom it may concern:*

Be it known that I, THOMAS G. PLANT, a citizen of the United States, and resident of Boston, in the county of Suffolk and State of Massachusetts, have invented an Improvement in Sewing-Machines, of which the following description, in connection with the accompanying drawings, is a specification, like characters on the drawings representing like parts.

My invention in sewing machines is especially useful in connection with what are known as "curved needle welt" or "turn" machines, extensively used in the manufacture of boots and shoes, and because of its especial utility in connection with machines of this type I shall illustrate and describe my invention in connection with such a machine without, however, limiting my invention thereto.

My invention relates more particularly to a gage or support for the shoe or work and to means for operating and retaining it in desired position.

The accompanying drawings illustrate one embodiment of my invention, and, referring thereto: Figure 1 represents in front elevation a typical "welt" or "turn" shoe sewing machine; Fig. 2, a vertical section on the dotted line 2—2, Fig. 1, looking to the left; Fig. 3, a vertical section on the dotted line 3—3, Fig. 1, looking to the right, this view being upon an enlarged scale; Fig. 4, a plan view, partial section, of a gage and its support illustrating my invention, in connection with parts adapted to operate in connection therewith; Fig. 5, a detail to be referred to; Fig. 6, a cross sectional detail on the dotted line 6—6, Fig. 5; and Fig. 7, another, sectional detail to be referred to, on the dotted line 5—5, Fig. 5.

For the purpose of disclosing my invention, I have illustrated the same in connection with a "welt" and "turn" sewing machine of well known type, but it should be understood, however, that said machine is merely typical and that my invention is applicable to other types and constructions of machines wherever it may be found useful.

Referring to Fig. 1, the bed plate 1, the standards 2 erected thereon carrying the main shaft 3, the curved needle 16 (Figs. 2 and 3), its operating link 11 and lever 6 operated from a cam 4 (Fig. 1), are typical of this well known character of machines. The awl-carrying segment 18, its awl 19 mounted upon the usual feed slide 21 and actuated in suitable manner, the feed slide operating lever 24, controlled by a cam 27 and the channel feed guide 30 mounted on said slide, the looper 36, its operating mechanism, the vertically movable stitch and substance protecting point 83 (Fig. 3) and its operating means, the slide rest 98, tension wheel 149, main take-up 159 and the several thread guides and thread trucks associated therewith are, and may be, considered as typical to corresponding mechanisms in other machines.

The back slide rest 98 has its slide bar 99 mounted in the machine head and provided with the usual ratchet lock teeth 103, with which coöperates the pawl 104 under the control of the spring 117 and immediately above the back slide rest 98 is the usual back gage 107. In machines as ordinarily made, however, this back gage is mounted upon the end of a rearwardly extended slide bar which is withdrawn prior to or during each feed of the shoe, so as to withdraw the back gage from possible interference therewith, and is then freed and permitted to spring forward under the considerable stress of its actuating spring, to find the work in its new position where it is usually locked to furnish a support for the work adjacent or opposite the sole, to resist the action thereat of the stitch forming devices. The slide rest 98 is similarly drawn normally forward by its spring 100, as shown best in Fig. 3, but is permitted customarily, to bear constantly upon the work below the sole and opposite the last, the spring permitting the slide rest to go and come as may be necessary to follow the changing shapes of the work presented to it, said slide rest being locked automatically by its pawl in the position where it is found just prior to the formation of each stitch. The object of the slide rest and the back gage, as will be gathered from the above, is to furnish a suitable support for the work during the formation and setting of the stitches. It has been found, however, in practice that the back gage, when operated as has heretofore been customary, by withdrawing it from the work prior to the feed and permitting it to be snapped or drawn quickly forward against the work at the close of the feed, constitutes a serious disturbing element in the machine, owing to the impact of its rapid reciprocations. Not only do the repeated blows occasioned by this impact produce a jarring of the work in the hands of the operative but such blows tend to drive the work over and to embed the oppositely facing channel feed guide in the bottom of the channel, in which it usually runs. The insole of a shoe is usually formed of a soft or spongy stock and, is easily penetrable so that the necessarily sharp edge of the channel guide is usually forced by these rapid blows into the bottom of the channel and more or less through what is known as the "between substance" constituting said bottom, thereby weakening the sole at that point, making it also difficult to feed the work. With these objections in mind, the back gage, marked 107 in the accompanying drawings, is not herein rigidly mounted upon the usual slide bar as heretofore but (see Fig. 3), is mounted upon the leading end of a relatively light auxiliary slide $a$. This auxiliary slide is mounted to slide in the same guideway with the main slide bar, herein marked $b$, the two forming in effect a two-part bar. Behind the auxiliary bar $a$ is arranged a light spring $c$, seated at its opposite end against a lug $c'$ on the main bar, said spring tending to maintain the auxiliary bar normally in an extreme forward or "feeling" position relative to its main bar. The two bars are, however, suitably connected as by a clutch, shown as a roller clutch $d$, pressed by its relatively light spring $d'$ normally into engagement with the inclined clutch plate $d^2$, whereby any forward movement of the main bar relative to or independent of the auxiliary bar will cause the two to be locked together and to be separated from top to bottom and both thereby wedged or locked in the guideway in which they are mounted.

If the main bar be withdrawn as heretofore customary, the auxiliary bar will be correspondingly withdrawn, the two bars being provided with engaging surfaces at $d^3$ for this purpose. When, however, the main bar is permitted or caused to be moved forward the auxiliary bar will likewise be moved forward with it, impelled by the light spring $c$, the two moving in unison until the back gage upon the leading end of the auxiliary bar, which serves as a "feeling" gage, meets and is arrested by the work, whereupon the slight continued movement of the main bar will cause the clutch $d$ to become effective to lock the two bars rigidly together and in their guideway. Thus, the impact at the moment of contact of the back gage with the work is so slight as to be scarcely noticeable and introduces no disturbing element into the handling of the work, nevertheless immediately upon the occurrence of this impact the said auxiliary bar becomes firmly locked and rigid, so as to furnish a substantial and sufficient back gage or support for the work adjacent thereto.

To reciprocate the main slide bar $b$ in one direction (see Fig. 2) I have provided a spring $b'$, connecting the end of said bar with the machine head. To move it in an opposite direction the same is surrounded by a clutch member $b^2$ which (see Fig. 3) is suitably mounted at $b^3$ upon the lower end of a lever $b^4$, fulcrumed at $b^5$ on the head and operated at its upper end by a cam $b^6$ (see Fig. 2).

The clutch member $b^2$ is held normally in a position of disengagement with the said bar by a spring $b^7$ (Fig. 3) which holds the said clutch member normally in an upright position where it slides freely in both directions on said bar. The moment, however, the clutch $b^2$ is tipped about its lower end $b^3$ it will grip the slide bar and cause the latter to be moved. To this end, immediately above the clutch $b^2$ (see Figs. 5, 6 and 7) the machine head is provided with a rearwardly extended stud $e$ upon which is mounted to slide freely a stop sleeve $e'$, in the end of which is an adjustable stop screw $e^2$. This sleeve is provided at its outer end with a flange $e^3$ and is drawn by a spring $e^4$ connected with the head, normally to its innermost position determined by said adjustable screw $e^2$. The flange $e^3$ stands in the path of movement of the clutch $b^2$ so that as said clutch is drawn rearwardly by its lever $b^4$ it moves idly along the slide bar $b$ until its upper end engages the said flange $e^3$, which causes the clutch to be tipped to grip the slide bar $b$ and, for the balance of its movement, cause said slide bar to move with it, thereby withdrawing said bar and the auxiliary bar and its back gage, from the work. The distance through which the withdrawal of the slide bars thus occurs is, of course, determined by the position of the flanged sleeve and the point at which it will cause the clutch to be moved to grip the slide bar. If said sleeve be adjusted inward it will cause an earlier engagement of the clutch with its slide bar and a correspondingly longer movement or withdrawal. Conversely, if it be adjusted rearward the engagement of the clutch will be later and the resultant movement of the slide bar less, but the movement is always uniform for any given adjustment of the sleeve, irrespective of the position of the slide bar.

Return movement of the clutch lever $b^4$ permits the slide bar, still under the control of the clutch, to be drawn forward by its spring $b'$, the flange sleeve following it, drawn by its own spring $e^4$ until said sleeve is arrested by contact of its stop screw with the stud $e$ (Fig. 7), whereupon the clutch $b^2$, being no longer controlled by a stronger spring, is free to be tipped by its own spring into upright position to free the slide bar. If the work moved into position in front of the back gage is more remote from said gage than previously, then the said slide bar with its auxiliary bar and the back gage are free to be drawn by the spring $b'$ forward through the clutch, after the latter has come to rest and until said gage is arrested by the work, as described. If, on the other hand, the work moved into position is such as to call for a more inward position of the said back gage, then said gage will contact with the work and cause its auxiliary and main slide bars to be locked before the clutch has completed its forward movement, in which case the clutch may continue its movement without correspondingly moving its slide bar; in other words, the clutch is effective to draw its slide bar rearward or to control its forward movement so long as the spring action tending to move its slide bar forward exceeds or keeps in advance of the travel of the clutch. When the movement of the slide bar is arrested the clutch is free to continue its movement, or, when the clutch is straightened to release the slide bar, the latter is free to continue its movement.

With the machine in operation, the parts described operate as follows: After the formation of each stitch and preparatory to the next stitch the work is fed forward by the awl, in a manner well understood by those skilled in the art. Preparatory to such movement the clutch is drawn rearward to draw also rearward the two slide bars and the back gage. Immediately upon completion of the feed the clutch, under the control of its cam, is permitted to return again to its forward position, permitting and controlling the forward movement of the two slide bars until the auxiliary bar is arrested by feeling contact of the back gage with the work, whereupon both bars are rigidly locked as stated. This forward movement is not only controlled by the cam and therefore may be made as gradual as is consistent with quickness of response but its disturbing action is further eliminated by the fact that the initial contact or impact of the back gage with the work is so light as to be scarcely determinable; yet it causes instant locking of the gage, to give it that firmness and rigidity so necessary to successful sewing and otherwise usually had only by making it of substantial weight and impelled by a strong spring or equivalent motive power. My improved gage therefore and the manner of moving it, combine the utmost strength and rigidity of support with the lightest possible and most delicate action and contact with the work. In practice, this is found greatly to improve the product of the machine.

To guard against accidental release of the lock and displacement of the parts by contact with the leading end of the main slide bar or otherwise, I prefer to use in connection with the construction just described the usual ratchet lock, comprising the pawl 113. In such event, the two pawls 113 and 104 will have their tails 115, 116 arranged to be moved for release of the pawls by the end 118 of a lever 119, fulcrumed at 120 and controlled by a cam operating upon the roller stud 121.

The welt, marked "W" (Fig. 3), which is the part with which the back gage ordinarily contacts, is usually of a soft material and led by nicely adjusted means into proper position to be penetrated by the needle 16 as it advances. This makes it extremely desirable to provide a back gage means such as herein described, which will furnish the required firm support yet which will advance with so little disturbing action that it will not embed itself in or cause displacement of the welt itself nor penetration of the "between substance" at the bottom of the channel by the relatively sharp channel guide.

In Patent No. 877,858, dated January 28, 1908, I have shown and described means operated upon the stopping of the machine for severing the welt leading from the welt supply to the work so as to permit ready removal of the work, said severing means operating also to seize and hold the supply end of the severed welt in position to receive the initial needle thrust upon the beginning of work on the next succeeding shoe. Such a welt severing and holding means is herein illustrated, the same comprising the cutting and end holding shears 136, 139, the shear member 136 being pivoted at 137 upon the member 139, or the shank thereof, and having its extended end herein connected by a link $f$ with a segmentally shaped plate $f'$ (Fig. 3), fulcrumed at $f^2$ upon the head. This plate is provided with a treadle rod $f^3$, the treadle of which is positioned for convenient operation upon the stopping of the machine. When this treadle rod is depressed its segmental plate $f'$ is rocked to cause the welt cutting device to be advanced in a diagonally upward direction and when the fixed member 139 reaches the limit of its forward movement further movement of the said segmental plate will cause the movable member 137 to close upon it, thereby to sever the welt and hold the supply end thereof. In order that this welt severing device may be advanced into the preferred position relative to the welt to be severed, it should occupy a place coincident with or near to that occupied by the back gage described, making it desirable to withdraw the back gage when the welt severing device is advanced. To this end, the segmental plate $f'$ (see Fig. 3) is provided at its inner face with a stud $f^4$, shown in dotted lines, which stud enters a cam slot $f^5$ in an arm $f^6$, fulcrumed at $f^7$, on the head. This arm is acted upon to move it to its normal position by a spring $f^{8x}$ and at its upper end is connected at $f^8$ with the inner end of a stop rod $f^9$, the free end of which furnishes the stop to limit forward movement of said main slide bar and consequently the forward position of the back gage. To this end the said slide bar, opposite the end of said stop rod, is provided with a stud $f^{10}$, which, when the stop rod is in normal position, rests against the rear end thereof for the purpose described. This stop rod serves also as the means for withdrawing the back gage when the welt cutting device is advanced for, when the segmental plate $f'$ is rocked, as described, its stud $f^4$, acting in the slot $f^5$, will throw the arm $f^6$ rearward, to cause its stop rod $f^9$ to push rearwardly upon the stud $f^{10}$, thereby and correspondingly to push rearward the main slide bar $b$ and the back gage thereon. By this means, whenever the welt cutting device is advanced the back gage is withdrawn sufficiently to give it clearance and, conversely, when the welt cutting device is withdrawn, the back gage is permitted to advance to its proper position, or at least a clearance is made for its advance when necessary.

In still another co-pending application, filed by me Sept. 24, 1906, Ser. No. 335,903, I have shown and described stitch tightening devices in the form of nippers or pincers, adapted to seize the strands of the needle loop and move the same substantially in the direction of the stitches to tighen the latter independently of the needle or other tightening device and the said stitch tightening pincers were mounted upon the back gage slide so as to be advanced and retracted with it. The pincers are herein shown, marked 54, 55 (Figs. 3 and 4). These pincers are operated through the medium of a cam lever 61ᵃ from a cam upon the main shaft. Since these pincers in themselves form no part of the present invention, it is unnecessary further to describe them herein; my present invention so far as concerns the same, or their equivalent, relating to the combination of the same with the other devices herein disclosed. Whatever the construction of these stitch tightening devices or the equivalent thereof, the same are withdrawn with the main slide bar $b$ and the back gage to give clearance to the welt cutting device.

To permit of independent movement of the main slide without losing its effective relationship to the stop rod $f^9$, the latter is provided with a rearwardly extended tail piece that overlies the stud $f^{10}$ with which it coöperates.

By proper spacing of the interlocking surfaces $d^3$, to permit of the requisite movement of the auxiliary slide bar $a$ relative to the main slide bar $d$, or vice versa, it is possible, should it be desired, to permit the back gage 107 to remain in constant engagement with the welt or the work and to follow the changing contour thereof like the back slide rest 98, the main slide bar $b$ being advanced at the proper time to lock the auxiliary bar and its back gage frictionally in position. Such an arrangement would retain some of the advantageous features possessed by the construction operating as first above stated. The part that travels in contact with the work would be very light and not calculated to bunch the welt or unduly to indent or impress it.

Having described my invention and without limiting the same to details what I claim and desire to secure by Letters Patent is:

1. A sewing machine comprising in its construction a gage movable relative to the work, means to cause said gage to move forward to feel for the work, and a lock rendered effective by the gage finding the work to lock the gage in position.

2. A sewing machine comprising in its construction a gage movable relative to the work, yielding means to cause the gage to move forward to feel for the work, and means rendered effective by feeling contact of the gage with the work to lock the gage from further forward movement.

3. A sewing machine provided with a gage, means to move it toward and from the work, and locking means operable by contact of said gage with the work to lock the gage against movement.

4. A sewing machine provided with a gage, means to move it toward and from the work, and locking means dependent for its locking operation upon contact of said gage with the work to lock the gage against movement in a plurality of directions.

5. A sewing machine provided with a gage and a two-part support therefor, means to reciprocate said gage and its support, and means operated by relative movement between the two parts thereof to lock said gage in position.

6. A sewing machine provided with a gage and a two-part support therefor, means to reciprocate said gage and its support, and means operated by relative movement between the two parts thereof to lock said gage against forward movement.

7. A sewing machine provided with a gage, means to move said gage toward the work, and means rendered effective by contact with the work to lock said gage in position.

8. A sewing machine provided with a gage, a spring to press the same normally toward the work, means to withdraw the gage periodically from the work, and means rendered effective upon contact of the gage with the work to lock the same in position.

9. A sewing machine provided with a gage, a movable carrier therefor and by which said gage is supported, means to move said carrier and its gage toward the work, and work operated means to lock said gage when the latter reaches its working position.

10. A sewing machine provided with a gage, a movable carrier therefor and by which said gage is supported, means to move said carrier and its gage toward the work, and means rendered effective by contact of the gage with the work to lock the same in position.

11. A sewing machine provided with a gage, a two-part support therefor, a roller clutch between said parts, and means to permit relative movement of said parts when the gage meets the work to lock said gage in position.

12. A sewing machine provided with a gage, means to move it into variable position toward the work, a lock operated by contact with the work to lock the gage in position and means to move it a given distance away from each such variable position.

13. A sewing machine provided with a gage, means to move it into variable position toward the work, a lock operated by contact of the gage with the work to lock the gage in position and means to move it in an opposite direction always a predetermined but adjustable distance.

14. A sewing machine provided with a gage, a spring to move it forward, a lock operated by contact of the gage with the work to lock the gage in position, a clutch to move it backward, and an adjustable clutch actuating device.

15. A sewing machine provided with a gage, a spring to move it forward, a clutch to move it backward, and an adjustable clutch actuating device adjustably supported.

16. A sewing machine provided with a gage 107, the main and auxiliary slides therefor, the spring $b'$ for moving the main slide forward, the clutch $b^2$ for withdrawing the main slide, means to operate it, and the spring controlled adjustable sleeve $e'$ controlling said clutch.

17. A sewing machine provided with a gage, means to move it toward and away from the work, work contacting means to lock it in position, and stitch tightening means connected therewith and adjusted thereby.

18. A sewing machine provided with a gage, means to move it toward and away from the work, work contacting means to lock it in position, and stitch tightening pincers connected therewith and adjusted thereby.

19. A sewing machine provided with a gage, means including a clutch and spring to move it in opposite directions, work contacting means for locking said gage in position, welt cutting means, and means connected therewith and with said gage to cause simultaneous movement of the two.

20. A sewing machine provided with a gage, means to move it in opposite directions, work contacting means for locking said gage in position, welt cutting means, and means connected therewith and with said gage to cause movement of one upon movement of the other.

21. A sewing machine provided with a gage, means to move it in opposite directions, work contacting means for locking said gage in position, welt cutting means, and means connected therewith and with said gage to cause withdrawal of the former upon movement of the latter into operative position.

22. A sewing machine containing in combination a gage, means to move it to and from the work, means to lock said gage in position, welt cutting means, and connections for moving said gage and cutting means, one upon movement of the other.

23. A sewing machine containing in combination a gage, means to move it to and from the work, locking means for the gage, stitch tightening means connected with and to be moved by said gage, welt cutting means, and connections for withdrawing said gage and tightening means upon advance of said cutting means.

24. A sewing machine provided with a feeling back gage, and means to move it toward and from the work combined with locking means operable when the feeling back gage has found the work to lock said gage against movement.

25. A sewing machine provided with a feeling gage, means to move it toward and from the work, locking means for said feeling gage rendered effective by contact of said feeling gage with the work, a gage moving support, and independent locking means for said gage moving support.

26. A sewing machine containing in combination a back slide rest, means to move it toward the work and locking means therefor, a back gage, work contacting means to lock it, and a back gage support with locking means therefor operable simultaneously with said slide rest locking means.

27. A sewing machine provided with a gage adapted for contact with the work and to assume different positions according to the changing contour of the work combined with means operable by contact with the work to lock said gage in position against movement.

28. A sewing machine provided with a gage adapted for contact with the work and to assume different positions according to the changing contour of the work combined with friction means operable by contact of the gage with the work to lock said gage in position.

29. A sewing machine comprising a work feeling back gage combined with a slide bar operated from the back of the machine and extended through toward the front thereof, and locking means operated by relative movement of the slide bar and back gage to lock said back gage in work contacting position.

In testimony whereof, I have signed my name to this specification, in the presence of two subscribing witnesses.

THOMAS G. PLANT.

Witnesses:
 FREDERICK L. EMERY,
 ROBERT H. KAMMLER.